US009331964B2

(12) United States Patent
Rosenberg

(10) Patent No.: US 9,331,964 B2
(45) Date of Patent: May 3, 2016

(54) SYSTEM, METHOD, AND APPARATUS FOR USING A VIRTUAL BUCKET TO TRANSFER ELECTRONIC DATA

(71) Applicant: Einar Rosenberg, Miami, FL (US)

(72) Inventor: Einar Rosenberg, Miami, FL (US)

(73) Assignee: Creating Revolutions LLC, Miami, FL (US)

( * ) Notice: Subject to any disclaimer, the term of this patent is extended or adjusted under 35 U.S.C. 154(b) by 0 days.

(21) Appl. No.: 14/191,338

(22) Filed: Feb. 26, 2014

(65) Prior Publication Data

US 2014/0289832 A1    Sep. 25, 2014

Related U.S. Application Data

(60) Provisional application No. 61/769,680, filed on Feb. 26, 2013.

(51) Int. Cl.
*H04L 29/06* (2006.01)
*H04L 12/861* (2013.01)
*H04W 4/00* (2009.01)

(52) U.S. Cl.
CPC .......... *H04L 49/9063* (2013.01); *H04W 4/008* (2013.01)

(58) Field of Classification Search
CPC .......................... H04L 49/9063; H04W 4/008
USPC ............................................................ 726/7
See application file for complete search history.

(56) References Cited

U.S. PATENT DOCUMENTS

| | | | |
|---|---|---|---|
| 8,948,390 B2* | 2/2015 | Scott et al. .................... | 380/270 |
| 2003/0051146 A1* | 3/2003 | Ebina et al. ................... | 713/185 |
| 2005/0049929 A1* | 3/2005 | Hsu et al. ........................ | 705/26 |
| 2006/0085314 A1* | 4/2006 | Grim et al. ...................... | 705/35 |
| 2006/0277180 A1* | 12/2006 | Okamoto ......................... | 707/7 |
| 2007/0016586 A1* | 1/2007 | Samji et al. .................... | 707/10 |
| 2007/0136821 A1* | 6/2007 | Hershaft et al. ................ | 726/27 |
| 2008/0022290 A1* | 1/2008 | Ochiai et al. .................. | 719/315 |
| 2008/0080526 A1* | 4/2008 | Gounares et al. ............. | 370/401 |
| 2009/0072974 A1* | 3/2009 | Miyashita et al. ......... | 340/572.1 |
| 2009/0077674 A1* | 3/2009 | Shin et al. ....................... | 726/31 |
| 2009/0227282 A1* | 9/2009 | Miyabayashi et al. ..... | 455/552.1 |

(Continued)

OTHER PUBLICATIONS

File History for U.S. Appl. No. 14/455,553.

(Continued)

*Primary Examiner* — Michael S McNally
(74) *Attorney, Agent, or Firm* — Bergman & Song LLP; Michael A. Weinstein; Michael Bergman

(57) ABSTRACT

A method for transferring data between a first and a second computer system by way of a storage location in a third computer system. When needed for a transfer, the third computer system creates the storage location associated with the first computer system. Using the association, the first computer is able to access the storage location. The second computer system reads access information from a close proximity identification medium, where the information is associated with the storage location. Using the information, the second computer system is able to access the storage location. In a data transfer, one of the first and second computer system stores information in the storage location and the other of the first and second computer systems reads the data from the storage location. Once the data has been transferred from the storage location, the storage location is deleted.

8 Claims, 10 Drawing Sheets

(56) References Cited

U.S. PATENT DOCUMENTS

2009/0276861 A1* 11/2009 Russo et al. .................... 726/30
2010/0250955 A1* 9/2010 Trevithick et al. ............ 713/185
2011/0006883 A1* 1/2011 Chang et al. ................. 340/10.1
2011/0314279 A1* 12/2011 Ureche et al. ................. 713/167
2013/0303085 A1* 11/2013 Boucher et al. .............. 455/41.1
2013/0331063 A1* 12/2013 Cormier et al. ................ 455/411
2014/0059351 A1* 2/2014 Braskich et al. .............. 713/171

OTHER PUBLICATIONS

File History for U.S. Appl. No. 14/466,837.
File History for U.S. Appl. No. 14/524,657.

* cited by examiner

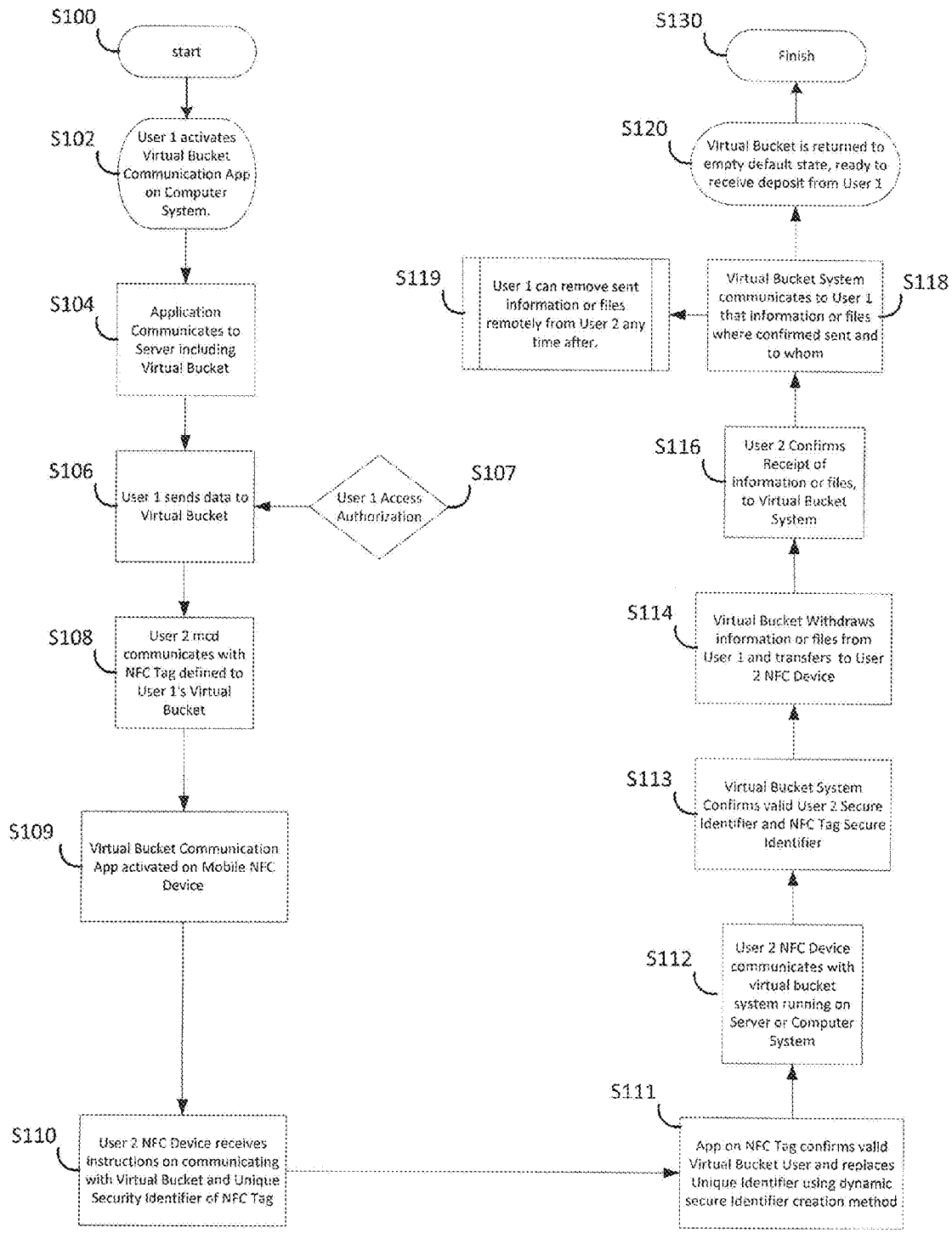

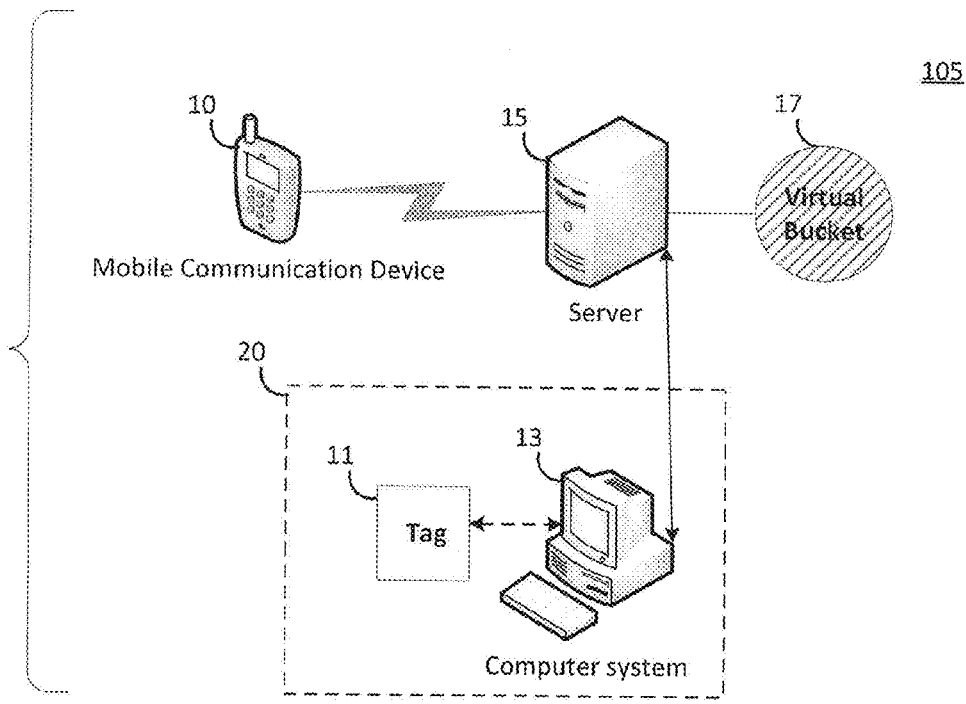
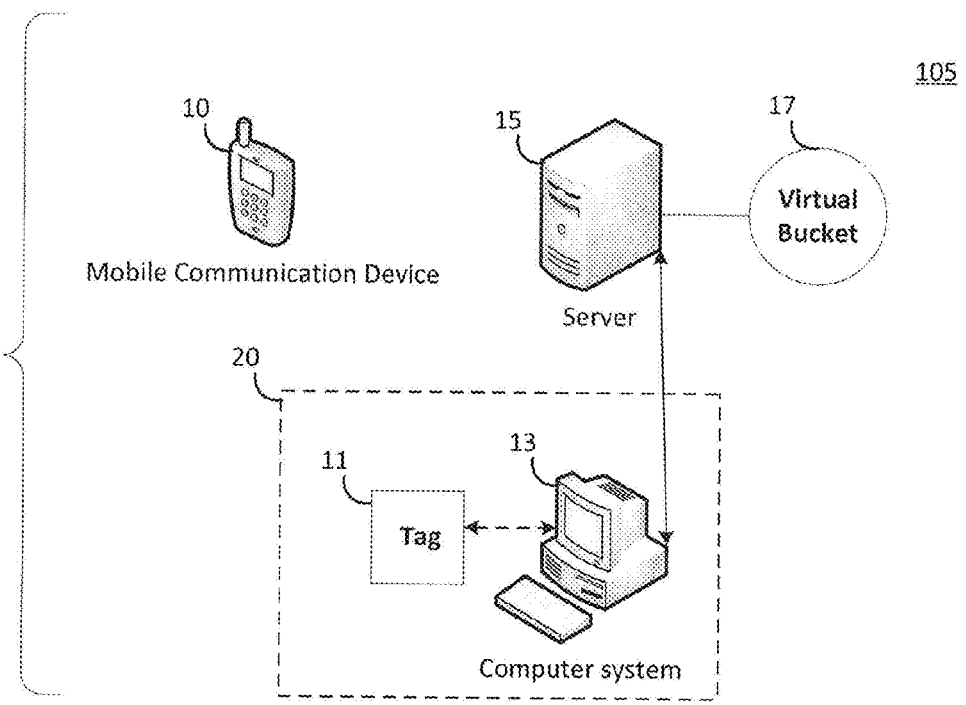

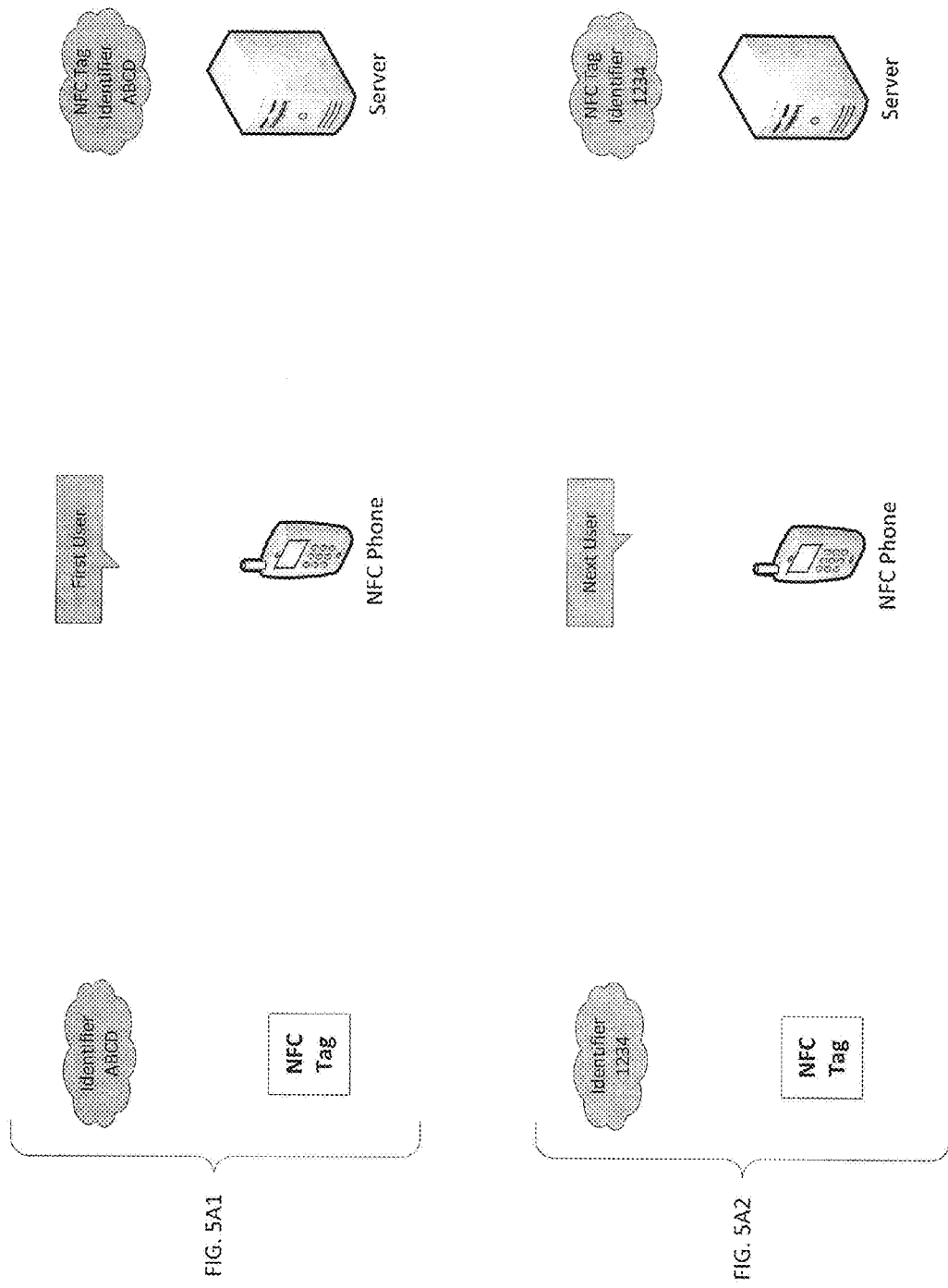

SYSTEM, METHOD, AND APPARATUS FOR USING A VIRTUAL BUCKET TO TRANSFER ELECTRONIC DATA

CROSS REFERENCE TO RELATED APPLICATIONS

This application claims the benefit of U.S. provisional patent application No. 61/769,680, filed Feb. 26, 2013, the disclosure of which is incorporated herein by reference in its entirety.

BACKGROUND OF THE INVENTION

As time progresses, more and more people are using computing systems, desktop computers, laptop computers, computers linked to cloud servers, tablets, mobile computing devices (e.g., smart phones), and other types of computing systems. Electronic data, e.g., information or file(s), are saved on a user's computing system and at some point in the future, it is inevitable that the user desires to transfer the electronic data to another computing system, either belonging to him or to another.

There currently exist many different methods to transfer electronic data from one computing system to another system. Each method has its characteristics, which play out as advantages or disadvantages. When a user desires to transfer electronic data wirelessly, additional considerations come into play, for many the most significant issue, aside from the establishing of the communication between the computing systems, is security for the transfer so that electronic file is safe guarded from source computer system to destination computer system.

One communication method for wirelessly transferring files from one computer system to another is Near Field Communications ("NFC"). NFC has an operating range of one to two centimeters, thus, two devices communicating using NFC method need to be very close together. NFC is a type of close proximity communication methods. More and more mobile communication devices are incorporating ("NFC") capabilities. NFC is a short range wireless technology designed for three core capabilities: The first is peer to peer connection, where two NFC devices can communicate with each other. The second is card emulation, where the NFC device can emulate an NFC card. The third is NFC Tag Read/Write, where the NFC device can read from or write to an NFC tag. An NFC tag is a type of close proximity identification medium that can be uncoupled or have a coupled connection to a computer system. The mobile communication device uses a close proximity communication method such as NFC, to read the tag and receive the unique dynamic ID. An NFC reader is example of a coupled connection. Transferring data using NFC between mobile communication devices is relatively simple and relatively secure (due to inherent requirement of the devices having to be located very close to each other.) However, it is more complicated for a computer system to securely transfer data via NFC.

To date most computer systems—computer systems that are not mobile communication devices—do not include NFC capabilities; thus, at the very least, the computer system must have an NFC device connected to that computer system in order to communicate using NFC. Adding NFC to a computer system can be costly. Additionally, adding an NFC device can be difficult to employ; for example, in situations where a physical environment restricts setting up a connected device that may require a coupled connection or power between the NFC device and the computer system.

Other methods of wirelessly communicating between a computer system and a mobile communication device would require multiple steps that lack the simplicity of NFC communications. Communication methods, such as sending an email or connecting via a local network connection to a user's device, require a multi-step pairing process.

For example, when completing a visit to a Doctor's office, a person is provided the opportunity to schedule their next appointment. The traditional method of receiving the scheduled appointment from the office is to receive a little card that has written the time and date of the next appointment. As the current method to add a digital entry into a phone has a user manually entering all of the details of the appointment data into phone it is not uncommon nor unexpected that an appointment card gets lost before the person adds the appointment to their personal calendar. This approach also demands the use of paper products that could be saved. It would generally be easier to wirelessly receive the calendar data and then select an option to save it into the user's phone's calendar system. Traditional methods of digitally sending this data to a phone are complex, where the user would have to either give the person providing the schedule the user's email address or they would have to pair wirelessly to some network or cloud based system, which can take multiple steps, and be vulnerable to security issues.

Therefore, it would be desirable to have a relatively simple, low cost, secure method of wirelessly transferring electronic data between computer systems.

BRIEF DESCRIPTION OF THE DRAWINGS

FIG. 1F depicts the server confirming to the computer system that the data deposited were withdrawn and to whom they were transferred to;

FIG. 2 depicts a process flow chart corresponding to the flow depicted in FIGS. 1A-F;

FIG. 3E depicts server communicating to the computer system that the data requested from user have been received;

FIG. 3F depicts the computer system withdrawing the data and/or files from the Virtual Bucket;

FIG. 5A1 depicts an close proximity communication Tag with a unique security identifier, a First User close proximity communication mobile communication device, and a Server synchronized with knowledge of the specific unique security identifier for that specific close proximity communication Tag;

FIG. 5A2 depicts an close proximity communication Tag with a dynamically changed unique security identifier, a Next User close proximity communication mobile communication device, and a Server synchronized with the knowledge of the newly created unique security identifier for that specific close proximity communication Tag;

FIG. 5B1 depicts a First User close proximity communication mobile communication device communicating to an close proximity communication Tag, and receiving communication instructions to the server and the close proximity communication Tags current unique security identifier;

FIG. 5B2 depicts the First User close proximity communication mobile communication device communicating to the server the unique security identifier while still communicating to the close proximity communication Tag;

FIG. 5B3 depicts the server generating a new unique security identifier for that specific close proximity communication Tag;

FIG. 5B4 depicts the server communicating the newly created unique security identifier to the specific close proximity communication Tag by using the close proximity communication mobile communication device as a conduit; and FIG. 5B5 depicts a Next User close proximity communication mobile communication device and an close proximity communication Tag and Server synchronized with the newly created security identifier information.

DETAILED DESCRIPTION OF THE INVENTION

Figure 1A:
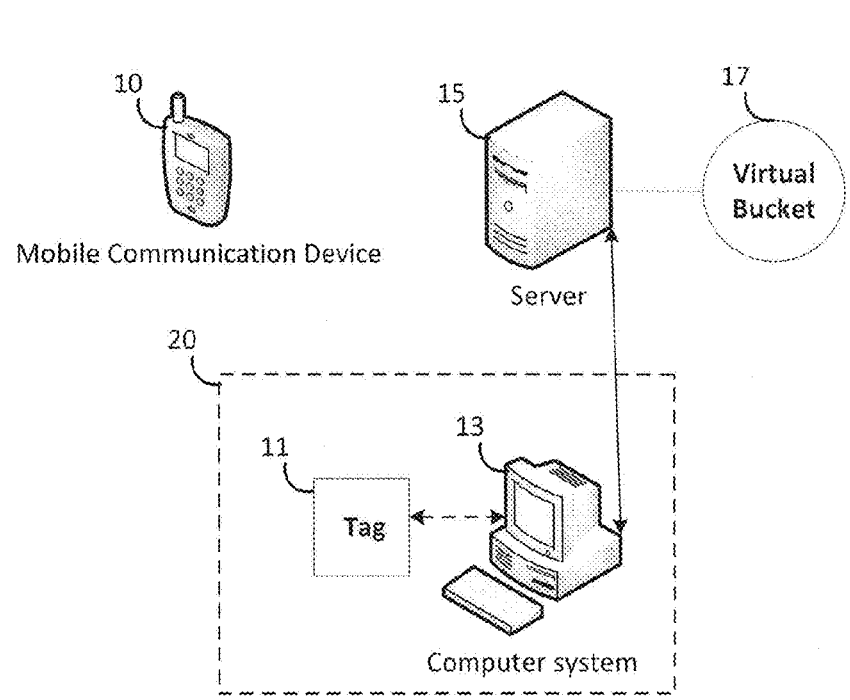
FIG. 1A depicts an close proximity communication mobile communication device, an close proximity communication Tag, a Computer System communicating to the Virtual Bucket System running on a server or computer system.

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

The invention discloses a method for transferring data between a computer system and a mobile communication device. More specifically, the invention discloses a method of using a dynamically changing unique identifier, a mobile communication device that can read the identifier, a computer system and a virtual bucket to enable the wireless transfer of electronic data between the computer system and the mobile communication device using the virtual bucket as a conduit and a temporary storage location for the electronic data.

In an aspect, a user simply "taps" his Smartphone on a data source, e.g., an close proximity communication tag, establishes communications with a data storage area, securely gets the data sent to their phone, and upon approval imported to their calendar on their phone. The close proximity communication mobile communication device reads, using in a preferred approach a type of close proximity communications method, e.g., NFC, a data source, e.g., an NFC tag, and instructions from the NFC Tag, to enable the Smartphone to communicate, using the communication instructions, generally using a second communication method not being a close proximity communication method, to a location where data is temporarily stored e.g., a virtual bucket, for downloading to the mobile communication device. Upon communicating with the computer system that includes the virtual bucket, the Smartphone can send data to the virtual bucket which in turn will be retrieved by a computer system and/or the Smartphone can retrieve data being stored in the virtual bucket which was stored there by the computer system or a second computer system. The computer system can also request data from the Smartphone and withdraw such data from the virtual bucket, once close proximity communication mobile communication device deposits them into a computer system's virtual bucket for retrieval by another computer system.

In an aspect, the invention also discloses a method of using a dynamic unique security identifier ("USI") on a close proximity tag, e.g., an NFC Tag. A Mobile close proximity communication Device reads the USI and server/computer system communication instructions. The USI maps to a unique virtual bucket for access by the Mobile close proximity communication device. Similarly, a computer system also maps to the unique virtual bucket for access to the virtual bucket. In an aspect, the relationship between the tag/virtual bucket/computer system is only maintained for a single transaction. After the transaction, the virtual bucket is deleted and a new virtual bucket created for association with the tag and computer system, but having a different USI. By virtue of being dynamic, the USI allows for enhanced security in at least two different ways: firstly, it reduces the possibility of the NFC Tag being impermissibly cloned, which the computer server uses to know which virtual bucket corresponds to the computer system defined to that NFC Tag. Secondly, by virtue of having a dynamic association, it reduces the probability of a third party impermissibility seeking and accessing the virtual bucket thereby increasing the security of the system. In an aspect, a USI is relatively anonymous and thus increases the security of the system.

FIG. 1A discloses a data transfer system 5 and method in accordance with an exemplary embodiment of the invention. The system 5 includes a close proximity communication enabled, e.g., an NFC enabled, mobile communication device 10, an information source 20 which includes a close proximity communication enabled transfer description data source 11, e.g., an NFC tag 11, and a computer system 13, and a computer system 15, e.g., an Internet connected server, which includes a storage area 17, e.g., a Virtual Bucket.

The NFC mobile communication device 10 can be any mobile computer processing device, including but not limited to a mobile phone (including a Smartphone), tablet, laptop, etc. In an approach, communications between a tag 11 and a device 10 are done through near field communications and other communications between other devices is generally done through communications other than near field communications, e.g., secondary communications methods. In a preferred approach, the mobile communication device 10 is NFC enabled and includes at least two communications capabilities: near field communications and a second, non-near field communication method. The second communication method is, for example, Wi-Fi, Bluetooth, Cellular, Wireless USB, Ethernet, or any other wireless communication method which enables the mobile communication device 10 to communicate with the computer system 15. Although the invention is described as using near field communications, the invention is not so limited and any communication system can employed; however, in a preferred approach close proximity communication methods are preferred for communications between the mobile communication device 10 and a transfer description data source 11. In another aspect, the second communication method is a hardwired communication method.

The mobile communication device 10 includes and is executing an appropriate app, program, application, plug-in, etc, for causing the of reading data from an NFC tag, interpreting the data, acting on the data, communicating with a server 15, and transferring data from/to the virtual bucket of server 15. In an aspect, when the data has been received from the virtual bucket 17, the app confirms (with the user) of the mobile communication device 10 that the data should be stored and determines where the store the data or request information from the user. For example, the app identifies what kind of data file has been received and depending on the type of data file, the Virtual Bucket app saves the data in a particular location. For example, if the Virtual Bucket app identifies data received as a calendar entry for a particular calendar system (e.g., Google, yahoo, etc) on the user's mobile communication device 10 and when approved for storage by the user, the Virtual bucket causes the stores the data in the storage area for that calendar system. Different types of data are generally stored in a location specific for that type of data.

In an aspect, the mobile communication device 10 is preferably running an appropriate program, e.g., a Virtual Bucket app for a mobile communication device, for the context of the device and the context of use, e.g., electronic data exchange with another computing system using a virtual bucket. The virtual bucket app on the mobile communication device performs and/or causes the mobile communication device 10 to perform the actions necessary to transfer electronic data to a virtual bucket or from a virtual bucket. The Virtual Bucket app effectuates transferring electronic data from the mobile communication device 10 to an identified virtual bucket 17 for transfer to another computing system 13. In another aspect, the Virtual Bucket app effectuates transferring electronic data to the mobile communication device 10 from an identified virtual bucket 17 which received the data from to another computing system 13.

In an approach, a user manually selects the Virtual Bucket app to run on the mobile communication device 10. In another approach, the user touches the mobile communication device 10 to the NFC tag 11 which initiates NFC communications using the inherent NFC capability of the mobile communication device 10. As part of the initial communications, the mobile communication device 10 receives data from the NFC tag 11. Part of the data received from the NFC tag 11 indicates an appropriate program to be running on the mobile communication device 10, e.g., the Virtual Bucket app. In a preferred approach, the mobile communication device's 10 operating system looks for the Virtual Bucket app on the mobile communication device 10, and if it isn't already executing, then using another part of the data received from the NFC tag 11, the operating system, alone, or in combination with other aspects of the mobile communication device 10, determines where to download the Virtual Bucket app from and causes the Virtual Bucket app to be downloaded, installed and executed on the mobile communication device 10.

If the mobile communication device 10 reading the data does not have the program residing on the mobile communication device 10, then based on inherent NFC standards, the mobile communication device 10 uses the program designation data to communicate with the appropriate location indicated by the program designation data, e.g., a website, and causes the appropriate app to be downloaded to the mobile communication device 10. The program is downloaded and installed and begins execution. Another piece of data to be read by the mobile communication device 10 is communication data. When the mobile communication device 10 reads using NFC communications the communication data from the tag 11, the mobile communication device 10 interprets the data. In the context where the communication data is a virtual bucket location for a file, mobile communication device 10 uses appropriate communications and causes a connection to be made to the location identified by the communication data, e.g., server 15. Thereby, the virtual bucket app on the mobile communication device 10 communicates with a virtual bucket program executing on the server 15.

The Virtual Bucket app on the mobile communication device 10 uses part of the data received from the NFC tag 11 to determine what to do. For example, the Virtual Bucket app receives communication information providing information on how to communicate with the Virtual bucket 17. For example, the communication information is a URL or web site address of the Virtual Bucket 17. The communication information may also contain a preferred communication method for communicating with the virtual bucket 17. For example, a preferred communication method is the Internet. In an aspect, the communication information includes access information, e.g., a username and password, to access the Virtual Bucket. Thus, using the communication information the Virtual Bucket app causes the mobile communication device 10 to establish communications with the virtual bucket 17.

As noted above, an information source 20 includes a transfer description data source 11, e.g., a tag, and a computer system 13. In a preferred approach, the information source 20 is the source of the electronic data sought to be transferred to the mobile communication device 10. More specifically, the computer system 13 includes the electronic data sought to be transferred to the mobile communication device 10. Although depicted as a single information source 20, single tag 11 and computer system 13, the invention is not so limited, and the system 5 can have a plurality of information sources 20, tags 11, and computers systems 13.

The computer system 13 includes an appropriate program, e.g., a Virtual Bucket program, which is executed on the computer system 13. When executing, a user indicates to the program which data, e.g., a music, text, audio, video, calendar entry, contact, task, memo, etc, file is desired to be transferred to another party's computing system, e.g., mobile communication device 10. The computer system 13 has an associated virtual bucket 17 residing within a server 15. Although described as a single bucket corresponding to a computer system 13, the invention is not limited and in another approach, there is a plurality of virtual buckets 17 associated with a computer system 13. The program on the computer system 13 causes the data selected by the user to be copied and the copy sent to the server 15 with appropriate instructions that it should be placed in the virtual bucket 17 of the server 15.

In an approach, computer system 13 maintains identification information for the virtual bucket 17 associated with computer system 13. As such, when sending data is stored in a virtual bucket, the computer system 13 also sends virtual bucket identification information so that the server 15 is able to determine which virtual bucket the data is to be placed in.

In a preferred aspect, transfer description data source 11 includes at least several pieces of data that will be read by a mobile communication device 10 appropriate program designation data, communication data, access data, and identifying data. One piece of data to be read by the mobile communication device 10 is program designation data. This data indicates the appropriate program, e.g., the Virtual Bucket app, that a mobile communication device 10 should be executing to implement data transfer using a Virtual bucket. This data also indicates where the appropriate program can be located, e.g., downloaded from.

In an aspect of the invention, tag 11 includes access information. In certain situations, where increased security protocols are employed, a mobile communication device 10 may require additional information to access and retrieve data in a virtual bucket. For example, the additional information is a password or passcode that is provided to the server 15 to access the data in the virtual bucket. Thus, the mobile communication device 10 reads this information from the tag 11 and provides the access information to the server 15 when the mobile communication device 10 communicates with the server 15 to access the virtual bucket 15. In an aspect, tag 11 includes identifying information. In an aspect, the identifying information identifies the tag 11. The identifying information is, for example, a unique serial number for tag 11. In another aspect, the identifying information is USI. In another aspect, the identifying information is information that reflects a unique association between the tag 11 and a storage location.

The communication instructions received from tag 11 provide instructions to the mobile communication device 10 directing how the mobile communication device 10 can communicate with server(s) 15 including virtual bucket 17 which corresponds to the account linked to the specific NFC Tag 11 being communicated with. The communication instructions include, for example, URL, IP address, port, login process, application to application communication, api to api communication, and other methods of defining one device to a second device to communicate via electronic means.

In an aspect, the virtual bucket 17 has a unique bucket for a computer server 15. Thus, a virtual bucket 17 that receives data from computer system 13 and is able to identify the computer system 13, places the data in a specific virtual bucket corresponding to the computer system 13. The computer system 13 is aware of the corresponding virtual bucket and can communicate information to another device sufficient to access that corresponding virtual bucket. In another aspect, some identifying data which identifies the computer system 13 is also provided to the server 15 so that the server 15 can identify the computer system 13.

The server 15 executes a program that when permits a device to access and download data stored in the location identified by the communication data. The instructions can be what server, location of server, instructing a method of communication such as using Bluetooth or Wi-Fi to communicate with a localized device such as the computer system being nearby, or on the same network as the mobile device will communicate by. The system can also have instructions to communicate app to app, where the app on the phone is instructed on how to communicate with the app on the computer system. This is akin to setting up a virtual private network. The instructions can also include additional security aspects such as an RSA key, a public/private key encryption, etc. The instructions are instructions, and can vary, but at the end, are designed to tell the phone where and how to communicate to the computer system holding the virtual bucket.

In an aspect the server 15 including the virtual bucket 17 is a general public service such as Gmail or Facebook, and then people will sign up online to setup an account. That will then allow them to either download an app to their computer or they can run it via a web portal. They will be issued an NFC tag corresponding to that account, use a program to encode a blank NFC tag, or get a pre-encoded NFC tag for an account and then using the information from that NFC tag, will link it to an existing account or create an account based on that pre-encoded tag. In an aspect, the identifying information of the tag 11 received from the mobile communication device 10 is used by the computer server 1 to determine the account. In an aspect, this account is literally the virtual bucket and the corresponding dynamic id that is created, e.g., the id is address information for part, e.g., folder, of the account that will hold information, e.g., the bucket. Once they have the account on the server, and the NFC tag encoded to link to that account, the NFC mobile communication device simply uses the app installed on the phone, which they registered their own account, and processes the methods as described in the flow charts below. In another aspect, the server 15 including the virtual bucket 17 is a non-public, higher security, dedicated, partially or totally, server.

The server 15 maintains a linking database, which maintains the relationship information between computer systems, e.g., computer system 13, and virtual buckets, e.g., virtual bucket 17. The linking database also maintains the relationship information between tags, e.g., NFC tag 11, and virtual buckets, e.g., virtual bucket 17. In an aspect, the database is based on USI.

In an exemplary approach, the virtual bucket 17 deletes the data being held in the virtual bucked after the data has been requested and provided to the mobile communication device 10 so that no copy of the data remains on the server 15, e.g., the server deletes the virtual bucket 17 and any data contained therein. The server 15 then creates a new virtual bucket 17 having a new USI associated with it and updates its internal linking databases and in certain aspects conveys, directly or indirectly the USI for the new virtual bucket preferably to computer system 13 and NFC tag 11, respectively. In another approach the virtual bucket 17 deletes the data being held in the virtual bucked upon receiving a command so that no copy of the data remains on the server 15. In another approach, the virtual bucket 17 securely holds the data in the virtual bucket 17 until new data is transferred to the virtual bucket for downloading.

Although depicted as a single virtual bucket 17, the invention is not so limited, and the server 15 can have a plurality of virtual buckets 17. Further the system 5 only depicts one server 15, the invention is not so limited and the system 5 can have a plurality of servers 15.

While the invention references the use of NFC, other technologies may be substituted general modifications of some capabilities of the invention. It would be obvious to one with skill any modifications that would be necessary. For example, while some descriptions of exemplary embodiments of the invention are described with respect to the use of NFC technologies, other close proximity communications technologies can be substituted include, but are not limited to Barcodes (2D, 3D, and otherwise), Bluetooth and Bluetooth beacons, Wi-Fi, LED lights, etc. While the invention discloses an NFC Tag, an NFC Device can also be used such as an NFC Reader which is stand alone, connected to another computer system, or able to communicate with the server(s) or computer system(s) via network connection. In another approach, if communication method other than NFC is being employed, then an appropriate corresponding device is employed in place of an NFC tag. In an aspect, the server 15 is a separate computer system from computer system 13. In other aspects, the server 15 is the same as or an associated computer system with computer system 13.

FIG. 1A depicts a computer 13 communicating with server 15. As part of this communicating, the computer 13 provides access data, e.g., secure account access information, to server 15 and once authorized, is allowed to deposit information and/or files into a virtual bucket 17 within server 15. Ideally, bucket 17 is a specific, discrete location within server 15 that "belongs" to computer 13. Computer system(s) and/or Server(s) virtual bucket 17 system can be an file location or an application, stand alone or integrated into a third party application, which gives third party application virtual bucket capabilities, or can be an api running on the OS, where the api can define a specific storage location folder for the virtual bucket 17. As the virtual bucket 17 has not yet received data from computer system 13, the virtual bucket 17 is "empty" and is not shaded.

Figure 1B:
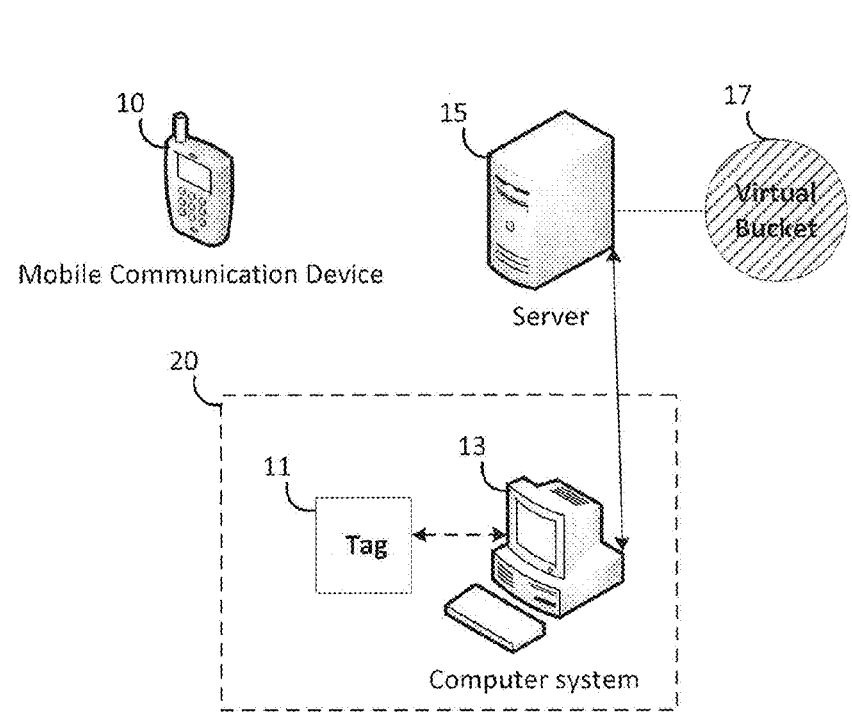
FIG. 1B depicts the computer system communicating to the server and depositing data into Virtual Bucket.

FIG. 1B depicts computer 13 communicating information and/or files that are to be stored in the virtual bucket 17 located or running on the server. In an aspect, the server 15 includes a current unique security identifier for the NFC Tag 11 corresponding to the computer system's 13 virtual bucket 17 running on the server 15. As the virtual bucket 17 has received data from computer system 13, the virtual bucket 17 is not "empty" and is shaded to reflect this.

Figure 1C:
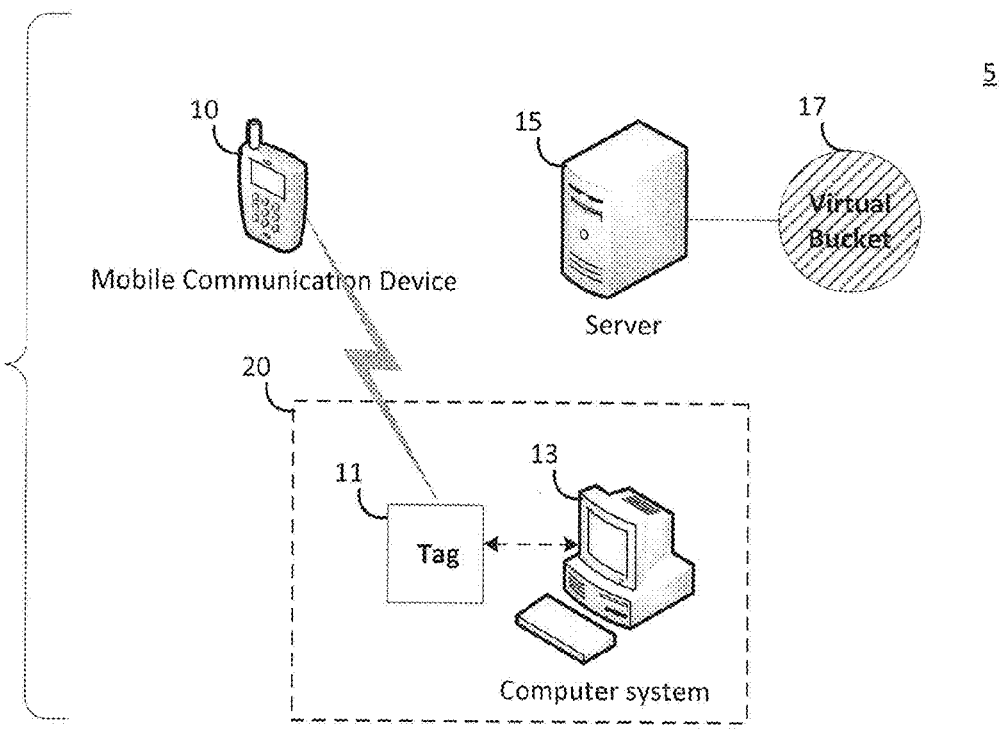
FIG. 1C depicts an close proximity communication mobile communication device reading server communication instructions and security identifier information from an close proximity communication Tag.

FIG. 1C depicts a mobile communication device 10 wirelessly communicating with tag 11, thereby requesting and receiving information contained on the tag 11, including, but not limited to, communication instructions from tag 11. Mobile communication device 10 also receives the unique identifier of the tag 11. In an aspect, the mobile communication device 10 also receives identification information regarding the location or identification of the virtual bucket. In an aspect, the mobile communication device 10 also receives access information.

Figure 1D:
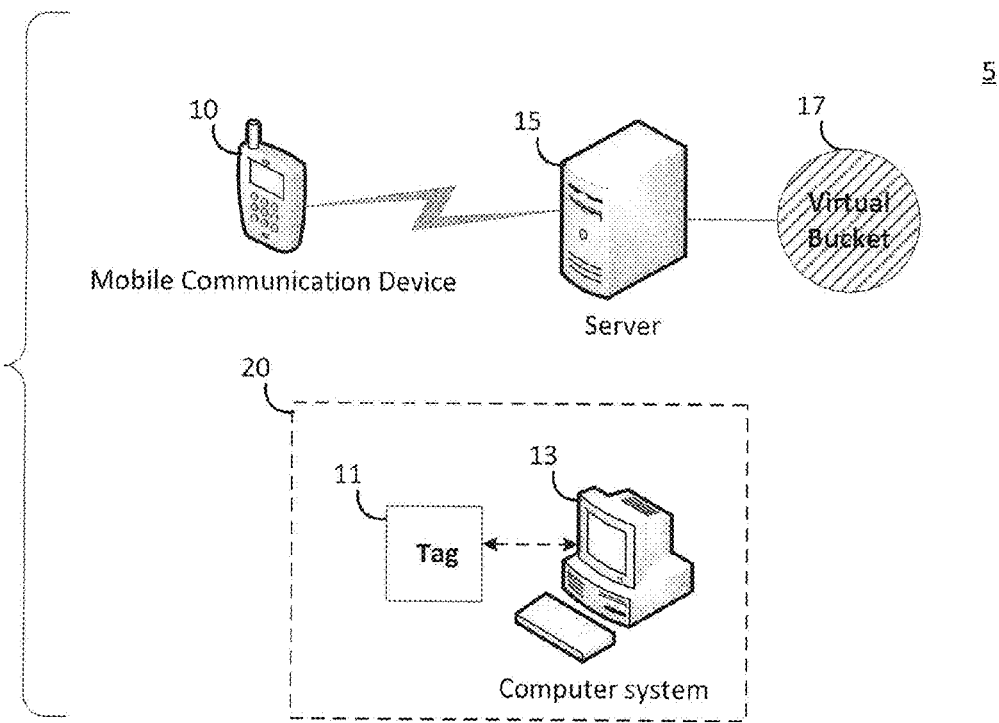
FIG. 1D depicts an close proximity communication mobile communication device using the server communication instructions to link to the server and send the security identifier as well as close proximity communication mobile communication device user identifier to the server.

FIG. 1D depicts mobile communication device 10 communicating with a server 15. In an aspect, mobile communication device 10 uses communication instructions received from the tag 11 to communicate with the server 15. Mobile communication device 10 transmits a unique tag identifier and/or a dynamic, and any instructions, warnings, or requests that may be defined by mobile communication device 10, for example, that it won't accept certain file types, or certain instruction types. For example, if this is an android phone, it won't accept ical invite, it can only process vcal or gcal invites. Ical is specific to iPhone OS, so it can instruct the server that it can't accept that file type, or the virtual bucket system on the mobile communication device 10. Additionally, for example, if the system is sending a request of specific data or files that the phone is to send to the virtual bucket, then the phone user can define things it doesn't want to send. For example, the system is requesting the user to send their full name, address, phone number, and email. The phone user can define that they will send first name, address and phone number, but not email or last name. The user can always define restrictions or filters of what they are willing to receive from the virtual bucket or give to the virtual bucket. The unique security identifier can be dynamic or a single consistent identifier such as a specific account name of the virtual bucket 17 for the specific computer system 20 that the tag 11 is defined to. In an aspect the mobile communication device 10 transmits secure identifier information of the mobile communication device 10.

Figure 1E:
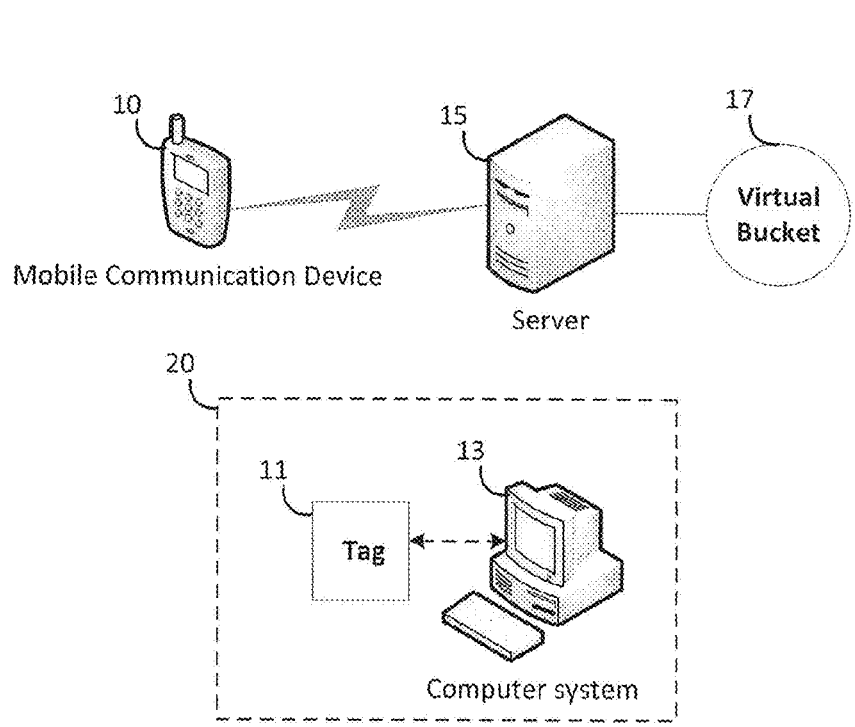
FIG. 1E depicts the server confirming the close proximity communication Tag Identifier and the close proximity communication mobile communication device User Identifier and then withdrawing the data or files held in the Virtual Bucket and transmitting the data to the close proximity communication mobile communication device.

FIG. 1E depicts mobile communication device 10 continuing to communicate with a server 15. After server 15 validates the unique tag identifier from tag 11 and secure identifier information of the mobile communication device 10, the server 15 processes any instructions, warnings, or requests. In an approach, the validation follows standard verification and acceptance protocols. It is the general process of establishing a secure method of communicating between a device and remote server/computer. An example of an instructions, warnings, or requests is when the server reacts based on these instructions, warnings, or requests. Example, if the phone doesn't accept ical, but the calendar invite was sent from a Mac, the server might have a conversion program to convert the file into a format that is acceptable by the mobile communication device. Another example is that the information is in English, but the user only speaks French, the server can then translate the information based on a user's request. The server 15 determines the virtual bucket 17 sought by the mobile communication device 15 based on identification information. The server 15 withdraws the data currently held in the virtual bucket 17 and transfers them to the mobile communication device 10. As the virtual bucket 17 has provided the data to mobile communication device 10, the virtual bucket 17 is "empty" and is not shaded. In an aspect, the mobile communication device 10 queries its user for approval of the storage of the received data.

Figure 1F:
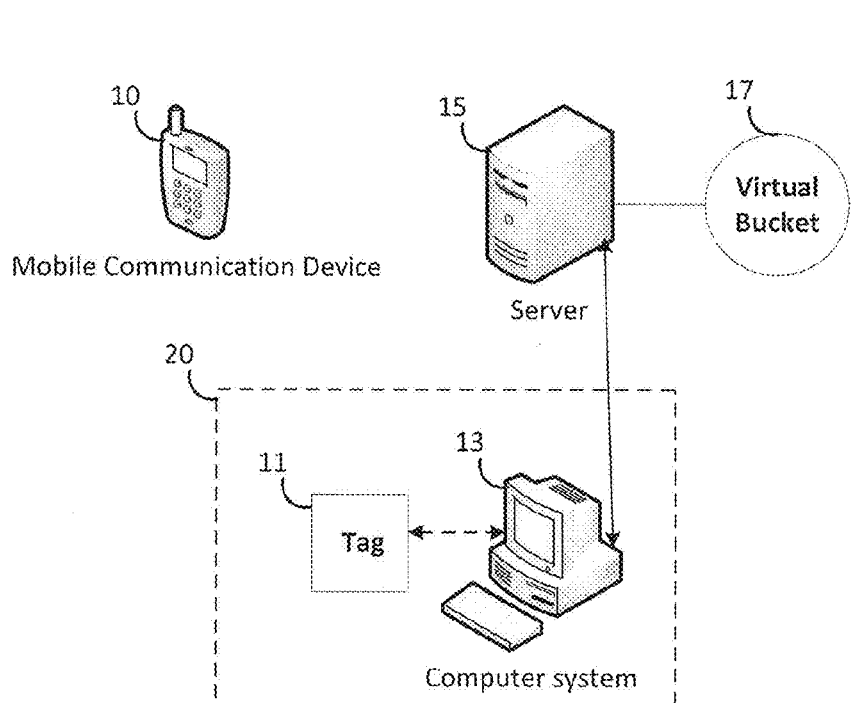

FIG. 1F depicts mobile communication device 10 having received data from the virtual bucket 17. In an aspect, the virtual bucket 17 is empty and ready to receive additional information and/or files from computer 13. In another aspect, the virtual bucket 17 still maintains a copy of the information transferred to mobile communication device 10. The server 15 communicates to the computer system 13, confirming the delivery of the information and/or files to the mobile communication device 10 and secure identifier information of the mobile communication device 10 that it was transferred to.

Thus, data is quickly and easily transferred from a computer system to a mobile communication device.

FIG. 2 is a flowchart that depicts an exemplary operation of an aspect of the invention generally in accordance with FIGS. 1A-F. In this exemplary process flow, User 1 corresponds to a user using computer system 13 and User 2 corresponds to a user using mobile communication device 10. (FIG. 1A).

In segment S100, the process flow begins. Process continues to segment S102.

In segment S102, User 1 activates a virtual bucket program on the computer 13. Process continues to segment S104.

In segment S104, the virtual bucket program executing on the computer 13 established communications with server 15. Process continues to segment S106.

In segment S106, User 1 selects data and sends the data to virtual bucket 17 part of server 15. As part of this process, User 1 provides its access information, S107, to the server 15 for access to the virtual bucket 17. If the virtual bucket 17 has not been created yet, then server 15 creates a virtual bucket 17 on server 15. Process continues to segment S108.

In segment S108, User 2 causes his mobile communication device 10 to communicate with NFC tag 11 and download information. Process continues to segment S109.

In segment, S109, if the Virtual Bucket App is not executing on the mobile communication device 10, then the mobile communication device 10 checks to see if the Virtual Bucket App is installed on the mobile communication device 10. If it is installed, then the mobile communication device 10 executes the Virtual Bucket app. If the app is not installed, the mobile communication device 10 uses part of the information from the NFC tag 11 and communicates with an appropriate location, e.g., website, where the app can be downloaded from and downloads and installs the app. Once installed, the mobile communication device 10 causes the app to be executed. Process continues to segment S110.

In segment S110, the virtual bucket App determines based on information received from tag 11 information for communicating with the server 15. The virtual bucket app also determines unique security identifier for the tag 11 based on information received from tag 11. Process continues to segment S111.

In segment S111, in an aspect, an application running on the NFC tag confirms that the mobile communication device 10 is a valid user and replaces unique security identifier with a dynamic secure identifier. Process continues to segment S112.

In segment S112, mobile communication device 10 establishes communication with server 15. Process continues to segment S113.

In segment S113, in an aspect, the virtual bucket program on server 15 confirms that the user, e.g., mobile communication device 10, is a valid user. For example, the virtual bucket program on server 15 confirms the validity based on the EIN number, or some other unique identifier ideally created during an install on the mobile communication device 10. Process continues to segment S114.

In segment S114, the virtual bucket program on the server 15 takes the data from the virtual bucket corresponding to the computer 13 and causes the data to be sent to mobile communication device 10. Process continues to segment S116.

In segment S116, the mobile communication device 10 sends a signal to server 15 and confirms receipt of the data from server 15. Process continues to segment S118.

In segment S118, the server 15 sends a signal to computer 13 indicating User 2 (mobile communication device 10) has received file. In an aspect, at any time, User 1 can remove files from User 2. Process continues to segment S120.

In segment S120, server 15 deletes data from virtual bucket 17 and deletes virtual bucket 17. Process continues to segment S130.

In segment S130, the process ends. Thus, data has been transferred from the computer system 13 to the mobile communication device 10.

In another aspect, information is transferred from a mobile communication device to a computer system. The operation is similar to that described above with respect to FIGS. 1A-f. In this scenario, the computer system 13 requests specific data or files from the mobile phone 10. In an aspect, the mobile phone 10 does not remove information from the virtual bucket 17 but rather places information in the virtual bucket 17. The information can either be defined by the computer system 13, or it can be defined by mobile phone user 10. The information is then deposited into the virtual bucket 17 associated with the computer system 13. In an aspect, as long as the virtual bucket remains active, data can continue to be deposited and withdrawn using the virtual bucket.

In an exemplary approach, at least three things can be deposited into a virtual bucket: 1. Info/files deposited by computer system. 2. Request for info/files deposited by computer system. 3. Info/files deposited by phone into computer systems virtual bucket. The third scenario is an extension of the second, but in this case, there were no requests deposited. The mobile phone user simply deposited the info/files into the computer systems virtual bucket and the virtual bucket system informs the computer system that info/files have been deposited into the computer systems virtual bucket account and by whom.

Figure 3A:
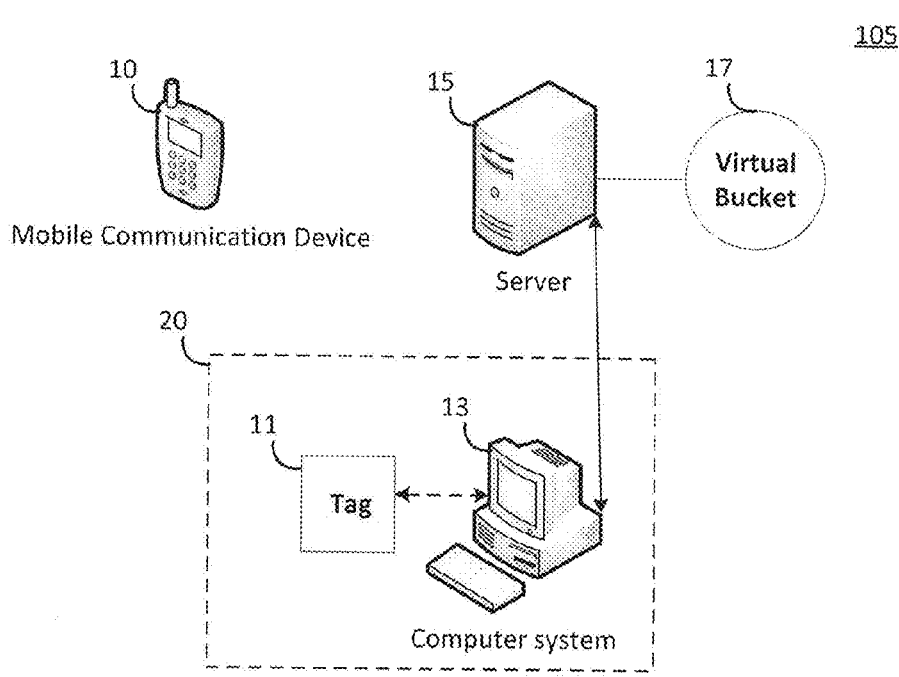
FIG. 3A depicts a computer system communicating to a server a request to have close proximity communication mobile communication device deposit requested data into a computer system's virtual bucket.

FIG. 3A discloses a data transfer system 105 and method in accordance with another exemplary embodiment of the invention. The system includes a close proximity communication enabled mobile communication device, e.g., a NFC enabled mobile communication device 10, a information source 20 which includes a close proximity communication tag, e.g., an NFC tag 11 and a computer system 13, and a computer system 15, e.g., an Internet connected server, which includes a storage area 17, e.g., a virtual bucket. In this aspect, the computer system 13 requests information from mobile communication device 10.

As depicted in FIG. 3A, the computer system 13 communicates to server 15 and indicates what data, e.g., which information and/or files, it wishes to request from mobile communication device 10. This request can include specific information such as name, email address, Q/A, lists, etc. Files requested can include documents, v-card, voice/video recording, etc. The request is held by the virtual bucket system.

Figure 3B:
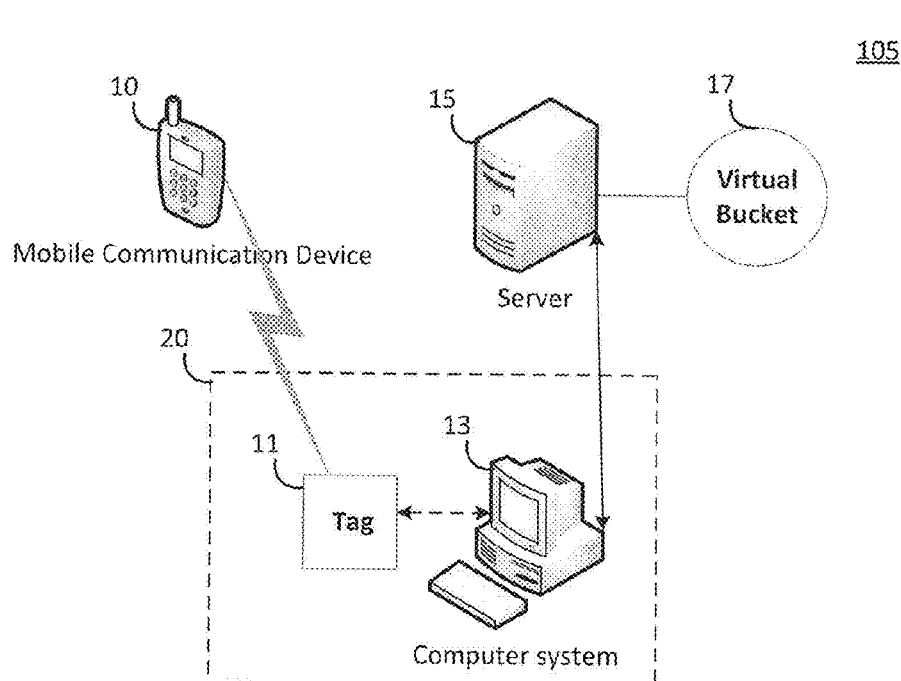
FIG. 3B depicts an close proximity communication mobile communication device communicating to an close proximity communication Tag and receiving instructions and security identifier for computer system's Virtual Bucket.

FIG. 3B depicts mobile communication device 10 communicating with tag 11, thereby requesting and receiving communication instructions from tag 11. The communication instructions provide instructions to the mobile communication device 10 to direct the mobile communication device 10 how to communicate with server(s) and/or computer system(s) 15 running virtual bucket 17 which corresponds to the account linked to the specific NFC Tag 11 being communicated with. Mobile communication device also receives the unique identifier of the tag 11.

Figure 3C:
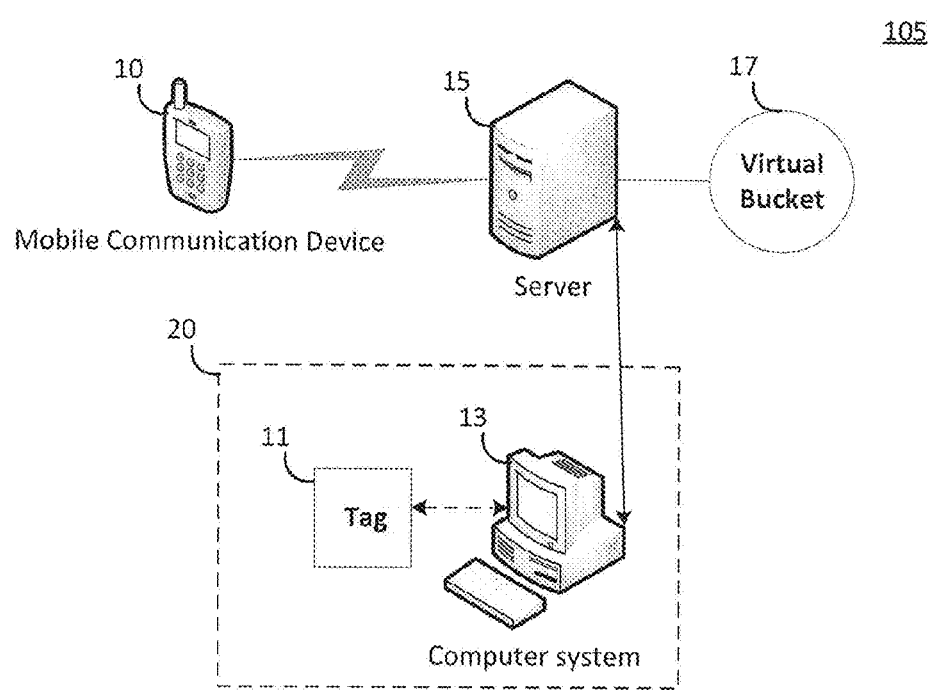
FIG. 3C depicts the close proximity communication mobile communication device communicating to the server the close proximity communication Tag security identifier and the close proximity communication mobile communication device Users security Identifier as well as receiving instructions of which data the computer system is requesting from the mobile communication device to be deposited in the Virtual Bucket.

FIG. 3C depicts mobile communication device 10 communicating with a server 15. Mobile communication device 10 transmits the unique tag identifier, and any instructions, warnings, or requests that may be defined by mobile communication device 10, or the virtual bucket system on the mobile communication device 10. The unique security identifier can be dynamic or a single consistent identifier such as a specific account name of the virtual bucket 17 for the specific computer system 20 that the tag 11 is defined to. In an aspect the mobile communication device 10 transmits secure identifier information of the mobile communication device 10.

Server 15 validates the information and if approved, the server 15 looks at the request in the virtual bucket 17. The server 15 then transmits the request from the bucket 17 to the mobile communication device 10 the request for information or files which the computer system is requesting from mobile communication device 10 user. Virtual bucket system on mobile communication device 10 generally requests its user for the information and/or files.

Example of verification is when the mobile phone user installs the app on their phone, they register for an account. When registering, the app will communicate to the server unique aspects of that user's phone such as the EIN number. This will validate that the user is a registered user for the system and that the person is whom they say it is. Unlike traditional methods where one uses a username and password, with this method, one can't have just anyone download the app on another phone and then login using your credentials and pretend it's that person. This method links at first registration, that phone to a unique account for the virtual bucket system. This securely identifies that user based on their first time registered.

Virtual bucket system on mobile communication device 10 can, if the user permits, automatically finds the information and/or files being requested, and list the requested items it found, as well as any items that are missing. If this ability is not activated by user, user will use traditional file search methods to access and locate files being request. For information requests, user can use traditional input methods such as keyboard or voice/video recording to supply the information being requested.

Figure 3D:
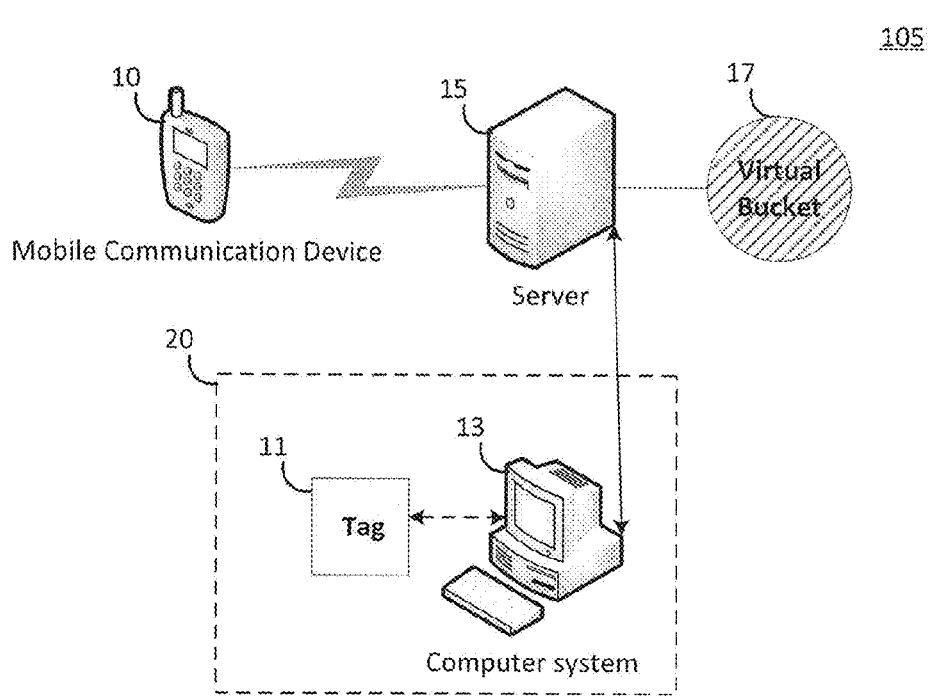
FIG. 3D depicts the close proximity communication mobile communication device depositing data that the user wishes to send or that the computer system has approved from the request of data that computer system requested.

FIG. 3D depicts that after the mobile communication device 10 gathers and/or generates information and/or files requested, and receives approval of the requested information, the mobile communication device 10 transmits the requested information and/or files to virtual bucket 17. Once the server 15 deposits the information in the virtual bucket 17, the server 15 sends mobile communication device 10 confirmation of the receipt of requested items.

FIG. 3E depicts that after the request data is stored in the bucket 17, the server 15 sends notification to the computer 13. In an aspect, the server 15 indicates to the computer 13 an inventory of the data received from mobile communication device 10: what items were received and which items were not, e.g., items not authorized or available by NFC mobile communication device user.

FIG. 3F depicts server 15 withdrawing information and/or files from virtual bucket 17 and transmits them to computer 13. Once computer 13 has received the information and/or files, the virtual bucket 17 is then emptied and ready for further use.

Thus, a computer system has requested data from a mobile communication device and the data has been transferred from a user's mobile communication device to a computer system.

Figure 4:
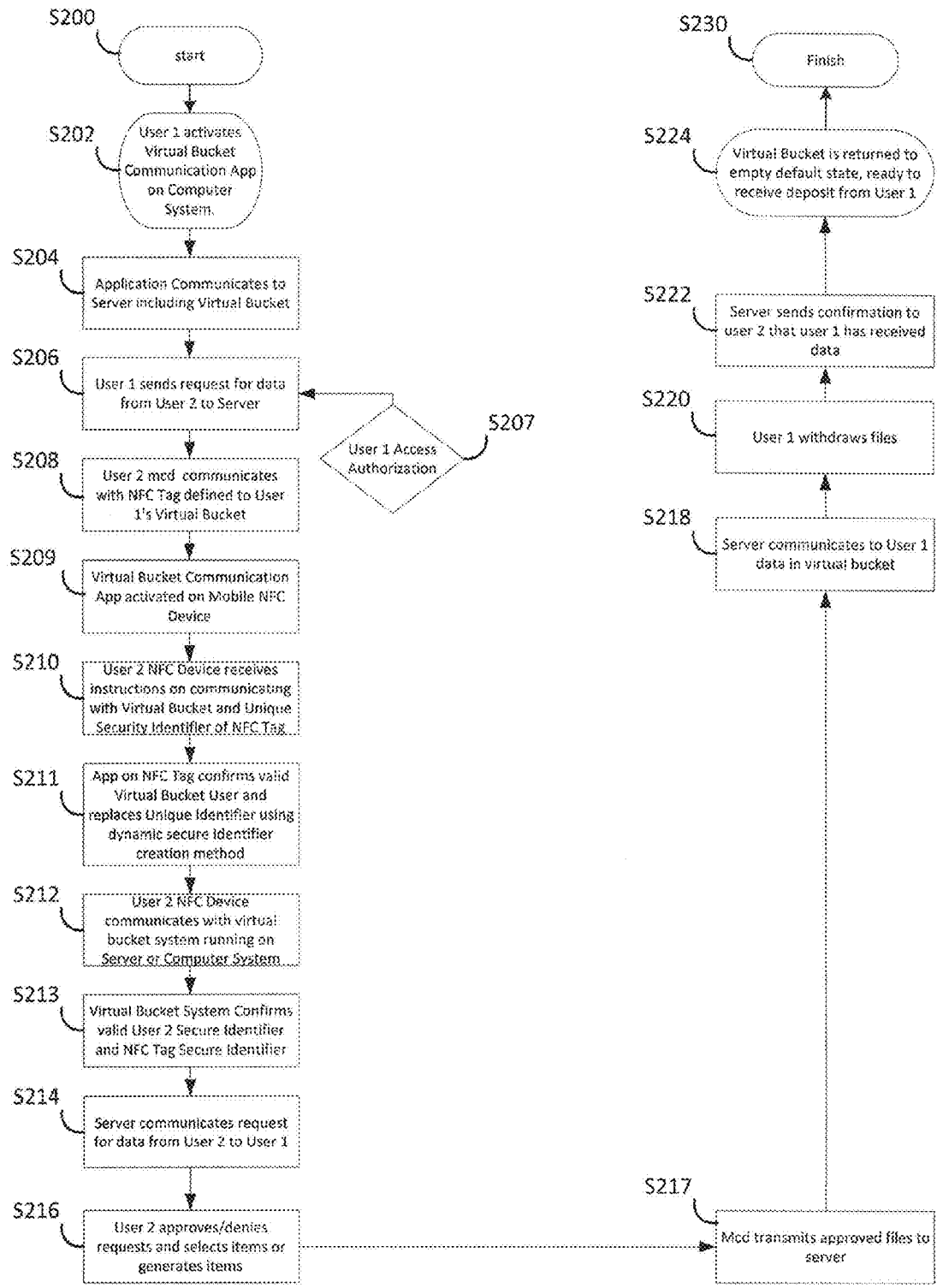
FIG. 4 depicts a process flow chart corresponding to the flow depicted in FIGS. 3A-F.

FIG. 4 is a flowchart that depicts an exemplary operation of an aspect of the invention generally in accordance with FIGS. 3A-F. In this exemplary process flow, User 1 corresponds to a user using computer system 13 and User 2 corresponds to a user using mobile communication device 10. (FIG. 3A).

In segment S200, the process flow begins. Process continues to segment S202.

In segment S202, User 1 activates a virtual bucket program on the computer 13. Process continues to segment S204.

In segment S204, the virtual bucket program executing on the computer 13 establishes communications with server 15. Process continues to segment S206.

In segment S206, User 1 sends a request for data from User 2 to virtual bucket 17 part of server 15. As part of this process, User 1 provides its access information, S207, to the server 15 for access to the virtual bucket 17. Process continues to segment S208.

In segment S208, User 2 causes his mobile communication device 10 to communicate with NFC tag 11 and download information. Process continues to segment S209.

In segment, S209, if the Virtual Bucket App is not executing on the mobile communication device 10, then the mobile communication device 10 checks to see if the Virtual Bucket App is installed on the mobile communication device 10. If it is installed, then the mobile communication device 10 executes the Virtual Bucket app. If the app is not installed, the mobile communication device 10 uses part of the information from the NFC tag 11 and communicates with an appropriate location, e.g., website, where the app can be downloaded from and downloads and installs the app. Once installed, the mobile communication device 10 causes the app to be executed. Process continues to segment S210.

In segment S210, the virtual bucket App determines based on information received from tag 11 instructions for communicating with the server 15. The virtual bucket app also determines unique security identifier for the tag 11 based on information received from tag 11. Process continues to segment S211.

In segment S211, in an aspect, an application running on the NFC confirms that the mobile communication device 10 is a valid user and replaces unique security identifier with a dynamic secure identifier. Process continues to segment S212.

In segment S212, mobile communication device 10 establishes communication with server 15. Process continues to segment S213.

In segment S213, the virtual bucket program on server 15 confirms that User 2 is a valid user. Process continues to segment S214.

In segment S214, the virtual bucket program on the server 15 takes the data request from the virtual bucket corresponding to the computer 13 and causes the data request to be sent to mobile communication device 10. Process continues to segment S216.

In segment S216, User 2 goes through the data request and approves or denies each request. For each approved request, User 2 selects data corresponding to the request. Process continues to segment S217.

In segment S217, the mobile communication device 10 transmits the selected data to server 15 to be placed in the virtual bucket 17. Process continues to segment S218.

In segment S218, the server 15 sends a signal to computer 13 indicating to User 1 that the requested data has been received into the virtual bucket 17. Process continues to segment S220.

In segment S220, User 1 causes the virtual bucket program on the computer system 13 to cause the server 15 to send the data in the virtual bucket 17 to computer system 13. Process continues to segment S222.

In segment S222, server 15 sends a signal to User 2 indicating that user 1 has received the data. Process continues to segment S224

In segment S224, server 15 deletes data from virtual bucket 17. Process continues to segment S230.

In segment S230, the process ends. Thus, User 1 has requested data from User 2 and User 2 sent the data to User 1 using a virtual bucket.

FIG. 5A shows that there is an app or process running on a server and separately on a close proximity communication tag, e.g., server 15 (FIG. 1) and NFC tag 11 (FIG. 1), respectively. In an aspect, the app is used generate security keys on respectively on each. These are synched by virtue of their programming and will change after every use of the virtual bucket. Because they are synched, they'll have the same corresponding unique identifier at substantially the same time; the unique identifier dynamically changes after every use of the virtual bucket, but each respective identifier will correspond after each change.

For example, an NFC tag 11 is the medium of communicating to a close proximity communication enabled mobile communication device 10 how to communicate to the computer system 13. In an aspect, the tag 11 provides a unique id of the computer system 13. The computer system 13 has also to store a unique id, the same id that is provided by the NFC tag to the mobile communication device 10. When a computer system 13 initially communicates to the server 15, in effect, the computer system 13 is requesting the use of a virtual bucket. When the server 15 creates a virtual bucket 17, the server 15 also creates a unique id to be associated with the virtual bucket 17. The server 15 provides the unique id associated with the virtual bucket it created for the computer system 13. When a virtual bucket transaction is completed, the server 15 eliminates the virtual bucket and its associated id and the server generates a new virtual bucket to be associated with the computer and generates a new bucket id and communicates it back to the computer system 13.

In an aspect, the mobile communication device 10 reads a security key from the tag 11 when reading other information and security key of the tag is compared to the security key of the server 15, generally by the server 15 and generally when the server 15 is validating other information received from the mobile communication device.

FIG. 5A shows the first stage of an exemplary dynamic secure close proximity tag identifier, e.g., NFC Tag identifier. The figure shows an NFC tag with the current unique identifier of ABCD. The server also has knowledge of this tags unique identifier. The unique identifier is used on the server to link a specific NFC tag to a specific virtual bucket running on the server. Both the server and the NFC tag are synchronized to have the same dynamically changing unique identifier. FIG. 5A1 shows that this unique identifier will be given to the First User NFC mobile communication device, by the NFC Tag, so that when the First User communicates to the Sever, it can transmit the unique identifier so as to instruct the virtual bucket system on the server which virtual bucket to access. The NFC Tag has a processor and memory. Running on that NFC tag can be an application or API, for dynamically generating a unique security identifier. This dynamic generation algorithm is also running in synchronous on the server.

In an exemplary approach, upon every use of the NFC Tag, the NFC tag will generate a new unique identifier. Based on the same algorithm running, separately, on each of the app and on the server, if the server receives a request containing the first unique identifier, at this point, it will process it, and at the same time generate a new unique identifier, based on the synchronized algorithm running on the NFC Tag. At the same time the NFC mobile communication device is reading the unique identifier, and while still communicating to the NFC Tag, the NFC mobile communication device is used as a conduit to receive confirmation from the server confirming that the unique identifier has been received. Once the confirmation is received by the application on the NFC Tag, the application generates a new unique identifier based on the synchronized algorithm.

FIG. 5A2 shows the same server and NFC Tag, but based on synchronization of the dynamic security identifier process, the NFC Tag now contains a new unique identifier, 1234. The server also has knowledge of this unique identifier and has linked the new unique identifier to the specific virtual bucket account defined for that specific NFC Tag.

This method of using a dynamic unique identifier can reduce the probability of an NFC Tag being cloned and remotely used, away from its proper physical placement. As well, the confirmation communication, where the server communicates via the NFC mobile communication device conduit, to the NFC Tags app, that it has received the unique identifier, reduces the security vulnerability of the NFC Tag identifier be generated and not synchronized with the information held on the server.

The NFC mobile communication device can also contain a unique security identifier or a secure credential to identify the NFC mobile communication device user as a valid user of the virtual bucket system, or an approved user allowed by User 1, to access User 1's virtual bucket. So the computer system can define which users are allowed to even request to access the virtual bucket system. The application to confirm credentials of the NFC mobile communication device User can run on an application running on the NFC Tags processor and memory as well as the server or computer system. The computer system can remotely communicate to the virtual bucket system on the NFC mobile communication device, post withdrawal, to remove or lock the information and/or files which the User 2 has just received from User 1's virtual bucket.

Figure 5B:
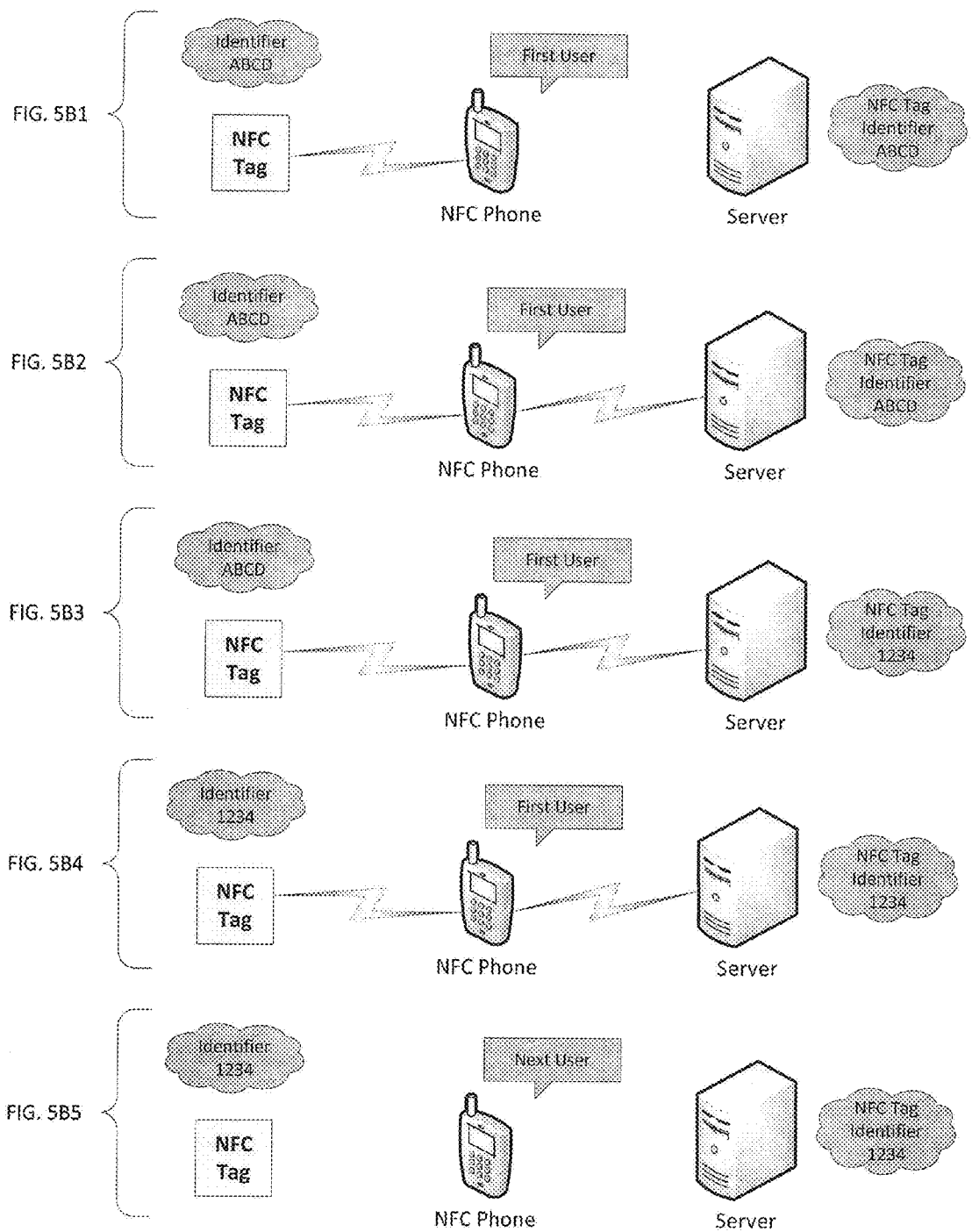

FIG. 5B shows a method of the new dynamic unique secure identifier of the NFC Tag, being generated by the server, and using the NFC mobile communication device, as a conduit to transmit a new unique identifier.

FIG. 5B1 shows an NFC mobile communication device of a First User, communicating to an NFC Tag with a unique Identifier ABCD.

FIG. 5B2 shows the NFC mobile communication device, while still communicating with the NFC Tag, begins communication with a server which has knowledge of that NFC Tags unique identifier ABCD.

FIG. 5B3 shows the server generating a new unique identifier for the specific NFC tag. This new unique identifier replaces the prior unique identifier for a specific virtual bucket account, defined to that NFC Tag. Therefore, virtual bucket account A was linked first by unique identifier ABCD. Now the server has generated a new unique identifier, 1234, which will be used by the Next NFC mobile communication device User, to access virtual bucket account A.

FIG. 5B4 shows the server with the newly generated unique identifier, 1234, using the NFC mobile communication device as a conduit, to communicate and encode unique identifier 1234, into the NFC Tag. The NFC Tag can contain an application or API, which can securely approve and/or confirm if that new unique identifier is being supplied by a valid server, computer system, or NFC Mobile device. This reduces opportunity for fraudulently encoding the wrong or malicious unique identifier onto the NFC Tag. The NFC Tag can also have a constant, read only unique identifier, which will work together with the dynamic unique identifier, to reduce opportunities of malicious encoding of the NFC Tag with a false or wrong unique dynamic secure identifier or to disrupt synchronization of unique identifiers between server and NFC Tag.

FIG. 5B5 shows the server and the NFC Tag, both containing the new server generated unique identifier for that NFC tag. The figure shows a Next User who can now interact with the NFC Tag and receive the new unique identifier. The process will be repeated with the new NFC mobile communication device user to generate yet another unique NFC Tag identifier to replace 1234. This allows for the server to generate more secure identifiers due to its more powerful processing power compared to the NFC Tag.

In another aspect, the virtual bucket system can also be used to confirm the validity of NFC mobile communication device and/or a User certificate method.

If the NFC mobile communication device does not contain a virtual bucket system or app, the NFC tag can include instructions, using standard NFC protocols, to download/install or activate dormant virtual bucket system application or API on the phone. Both the NFC Mobile Device User and the Computer System user are securely logged in or registered to the virtual bucket system. The mobile device, server, or computer system can act as the receiver or sender of the information and/or files being placed in the virtual bucket. The mobile device user can also request specific information and/or files from the computer system, for the computer system to deposit the requested information and/or files into the virtual bucket of the computer system.

The following are additional exemplary uses of the invention. Though not limited to these uses, these examples will demonstrate the spirit and general concept for using the invention.

Medical Office: A patient has just finished visiting the doctor for their routine appointment. The patient is at the exit counter checking out and ready to process scheduling their next appointment for their next appointment. The Nurse reviews the possible dates the dentist will be available and informs the patient. Patient looks at their calendar on their NFC mobile communication device and finds a mutually agreeable date and time for their next appointment. Nurse inputs information into the Doctor Office's calendar program. The calendar program contains a plug-in for a virtual bucket account for the Doctor's Office. The Nurse activates that plug-in and informs the patient she has placed the calendar file containing the appointment information into the dentist's virtual bucket. There is an NFC Tag on the counter, associated with the doctor office's computer, therefore defined to a virtual bucket of the Doctor Office. The patient executes a virtual bucket app on his mobile communication device and taps their NFC enabled mobile communication device on the NFC Tag. The NFC mobile communication device reads the NFC tag information and using the tag information the virtual bucket app on the mobile communication device accesses the virtual bucket and receives the calendar file from the medical office's virtual bucket. The patient opens the file on the mobile communication device, agrees that it should be saved on their mobile device. The mobile device records the appointment information into the patient's calendar. Such a file can be a standard iCal or Google Calendar file. The phone will interpret the file based on standard protocols for standard calendar files.

In another example, a college professor is having a meeting with a student after a test. This professor has over 500 students for that class. The professor is viewing that student's specific graded test, on the professor's computer screen. The student wishes to view their test as well on their NFC Tablet. The word processing application on the professor's computer has a plug-in, associated with the professor's computer, and is linked to the professor's virtual bucket. The professor wishes to only temporarily give the student the test to view on their tablet, during the current face to face meeting. The professor activates the virtual bucket plug-in, and it sends the document he is viewing to his virtual bucket. The student then takes their NFC Tablet, and taps it to a NFC Tag on the professor's desk. The NFC Tablet communicates with the professor's computer which is running the virtual bucket system, and after authorization, downloads the test file onto their tablet. Once downloaded, the NFC Tablet communicates to the virtual bucket system, receipt of the file, and who received it. After the face to face meeting, the professor does not wish to allow students to keep tests, so that future students don't have prior tests to review or copy from. The professor then activates the capability of the plug-in on his computer, to send a request to the virtual bucket system, to remove that document from the students Tablet. The virtual bucket system communicates to the Tablet and removes the test document. Once the test document is removed, the virtual bucket system informs the professor via their computer, that the file has been confirmed as removed from the student's tablet.

In yet another example, a virtual bucket system is employed in a Convention Booth: A business man is at a convention. He passes by a convention booth. A sales rep begins conversing with the business man, and offers that the business man takes digital copies of the sales rep's brochures. Based on the conversation, the sales rep collects only the brochures that meet the needs and requirements of products and services for this specific business man. Electronic copies of the selected brochures are placed in a virtual bucket associated with an NFC Tag on the back of the sales person's tablet, which they used to access the virtual bucket system running on a server. The business man then taps the NFC Tag on the back of the tablet with their own NFC mobile communication device. The NFC mobile communication device communicates to the server and after authorization, downloads the selected brochures. Upon receipt of the brochures, the sales rep's tablet informs them that the brochures where received, and to whom. The sales rep then asks the business man for their contact information. The sales rep sends a request to their virtual bucket, to request the name, phone, email, and address of the next person to tap that sales rep's virtual bucket NFC Tag. The business man taps their NFC mobile communication device to the NFC Tag on the back of the sales rep's tablet. The business man's phone now lists out the information requested in a check list. The business man does not mind giving the sales rep their name, phone, and email, but not their address. The business man marks the items on the list, they are willing to give to the sales rep and then presses send. The information is sent to the virtual bucket on the server from the NFC mobile communication device. Upon arriving to the sales rep's virtual bucket, the server then communicates to the sales reps tablet, that the information has been deposited into their virtual bucket. The sale rep then downloads the information from their virtual bucket, and saves it into their contacts on their tablet. The virtual bucket is now empty and ready to be filled again with new information and/or files.

In yet another example, a virtual bucket system is employed at a Drycleaners business. A customer arrives at a dry cleaner business. They have a suit to be dry cleaned. They give the suit to the owner of the dry cleaner, and discuss the customers' requirements for cleaning. The owner inputs these requirements into their computer. They also define a date that the customer can return to pick up and pay for the order. The computer program the owner is using incorporates a virtual bucket for that dry cleaning location. The owner press a button on the program to deposit into virtual bucket, a dry cleaning ticket, with information about the order, and a calendar file containing information on when to pick up the dry cleaning. The customer pulls out their NFC mobile communication device and taps it to the NFC Tag on the counter. The NFC mobile communication device communicates with a server running a virtual bucket system. After security authorization, the customer then downloads the ticket, order, and calendar file. The customer now has files for their order to remind them of what they left, as well as a unique ticket for proof of their order, and the calendar file recorded into the customer's calendar program. Upon receipt, the phone communicates to the server, which then informs the computer system and owner that the customer has received the files. A few days later, the customer's calendar has informed them of the order being ready, and return to pick up and pay for the order. The owner requests the ticket for the order using the virtual bucket system, via an application on the owner's computer. The owner then instructs the customer to tap their phone to the NFC tag on the counter. The customer then securely connects with the virtual bucket system on the server, and receives the request for the ticket. The virtual bucket app on the customer's phone finds the ticket, and informs the customer. The customer selects the ticket and then presses send. The phone then sends the ticket to the dry cleaners virtual bucket running on the server. Once the ticket has been received, the server communicates with the owner's computer, and informs the owner that the file has been placed in their virtual bucket. The owner then downloads and views the ticket. Then using the information of the ticket, the owner finds the order of the specific customer and gives the dry cleaned suit back to the customer. The customer approves and pays for the order.

In yet another example, a virtual bucket system is employed to Fill Out Forms: A man is at a community center and sees sign stating that they have sign ups available for 5 sports leagues, each with 10 teams per league. The man goes to the sports director's desk. The sports director pulls up a signup digital document on their computer, and places it into their virtual bucket. The man then taps his NFC mobile communication device to an NFC Tag on the sports directors' desk. The man's mobile communication device communicates to the server, and after being authorized, downloads the form onto their NFC mobile communication device. The virtual bucket system on the mobile communication device recognizes certain information on the form which is already in the man's phone, and incorporates it into the form. The man can then step through the form and complete the document—choosing which items he will and will not respond to. Any items not already available on the phone, the man can choose to input. After the man authorizes and/or inputs the information from the form, the man presses send. The information is then sent to the virtual bucket of the sports director, running on the server. The server then communicates to the sports directors' computer, informing him that the filled form has been received. The sports director downloads the file onto their computer. Upon download, the server sends confirmation to the NFC mobile communication device, confirming that the form they filled and uploaded has been received and by whom. Weeks later, the man became a member of the Miami Community Center's ping pong league, and is on team "Tiny Rackets".

While the invention has been described and illustrated with reference to specific exemplary embodiments, it should be understood that many modifications, combinations, and substitutions can be made without departing from the spirit and scope of the invention. For example, an operation described as occurring in software is not necessarily limited to be implemented in software and can be partially, substantially, or completely implemented in hardware. Similarly, an operation described as occurring in hardware is not necessarily limited to be implemented in hardware and can be partially, substantially, or completely implemented in software. Furthermore, although aspects of the invention are described with respect to using NFC communications and NFC tags, the invention is not so limited and many of these aspects can be implemented using other systems. For example, RFID, barcodes, scan codes, 3D readers, QR codes, Bluetooth Low Energy BLE, ultrasonic sound beacons, and other type systems can be employed. Accordingly, the invention is not to be considered as limited by the foregoing description but is only limited by the scope of the claims.

What is claimed as new and desired to be protected by Letters Patent of the United States is:

1. A method for transferring an electronic data between a first computer system and a second computer system using a third computer system, comprising the steps of:
   creating, by said third computer system, a temporary storage location in said third computer system;
   creating, by said third computer system, a unique identifier associated with said temporary storage location;
   associating, by said third computer system, said temporary storage location with said first computer system;
   reading, by said second computer system, using a first communication method a communication information from a close proximity identification medium;
   using, by said second computer system, at least a part of said communication information to establish communications using a second communication method with said third computer system; and
   deleting by said first computer system said data on said second computer system.

2. The method of using a temporary storage location on a server to transfer data between a first computing system and a second computing system, said method being operable in a first mode, comprising the steps of:
   creating a temporary storage location associated with said first computing system;
   creating an identification code for said temporary storage location;
   sending by said first computing system data to said server to be stored by said server;
   determining by said server a temporary storage location associated with said first computing system;
   storing said data in said temporary storage location associated with said first computing system;
   receiving from a close proximity identification medium by said second computing system a unique identifier for said close proximity identification medium;
   receiving from said close proximity identification medium by said second computing system a communication information;
   communicating by said second computing system with said server based on said communication information;
   providing by said second computing system to said server said unique identifier for said close proximity identification medium;
   determining by said server a temporary storage location associated with said unique identifier for said close proximity identification medium; and
   providing to said second computing system said data from said temporary storage location if said unique identifier for said close proximity identification medium corresponds to said identification code for said temporary storage location.

3. The method of claim 2, further comprising the steps of:
   deleting said temporary storage location associated with said first computing system; and
   deleting said identification code for said temporary storage location.

4. The method of claim 3, wherein said method being operable in a second mode, comprising the steps of:
   creating a second temporary storage location associated with said first computing system;
   creating a second identification code for said second temporary storage location;
   receiving from said close proximity identification medium by said second computing system a second unique identifier for said close proximity identification medium, where said second unique identifier corresponds to said second identification code;
   receiving from said close proximity identification medium by said second computing system a second communication information; communicating by said second computing system with said server based on said second communication information;
   providing by said second computing system to said server said second unique identifier for said close proximity identification medium;
   determining by said server said second temporary storage location based on said second unique identifier; and
   storing said second data in said second temporary storage location.

5. The method of claim 4, further comprising the step of:
   providing to said first computing system said data from said second temporary storage location.

6. The method of claim 5, further comprising the steps of:
deleting said second temporary storage location;
deleting said second identification code for said second temporary storage location;
creating a third temporary storage location associated with said first computing system; and
creating a third identification code for said third temporary storage location.

7. The method of using a temporary storage location to transfer electronic data between a first computing system and a second computing system, comprising the steps of:
creating, by a third computing system, a temporary storage location on said third computing system, said storage location being associated with said first computing system;
creating, by said third computing system, a temporary identification code associated with said temporary storage location on said third computing system;
reading, by said second computing system, an identification associated with said storage location from a close proximity identification medium;
sending data, by one of said first and second computing systems, to said third computing system determining, by said third computing system, a determined storage location;
storing, by said third computing system, data in said determined storage location;
receiving, by the other of said first and second computing systems, data from said determined storage location;
deleting said temporary identification code;
deleting said determined storage location;
wherein said step of determining, by said third computing system, a determined storage location further comprises the steps of:
in the case of said first computing device being said one of said first and second computing systems, said third computing device determines said determined storage location being said storage location being associated with said first computing system; and
in the case of said second computing device being said one of said first and second computing systems, said third computing device determines said determined storage location being said storage location based on said identification associated with said storage location from said close proximity identification medium.

8. The method of using a temporary storage location to transfer electronic data between a first computing system and a second computing system, comprising the steps of:
creating, by a third computing system, a temporary storage location on said third computing system, said storage location being associated with said first computing system;
creating, by said third computing system, a temporary identification code associated with said temporary storage location on said third computing system;
reading, by said second computing system, an identification associated with said storage location from a close proximity identification medium;
sending data, by one of said first and second computing systems, to said third computing system determining, by said third computing system, a determined storage location;
storing, by said third computing system, data in said determined storage location;
receiving, by the other of said first and second computing systems, data from said determined storage location;
deleting said temporary identification code;
deleting said determined storage location; and
deleting by said first computer system said data on said second computer system.

* * * * *